(12) United States Patent
Lieberman (10) Patent No.: US 6,870,005 B1
(45) Date of Patent: Mar. 22, 2005

(54) OLEFIN-BASED THERMOPLASTIC ALLOY, PROCESS FOR MAKING THE SAME AND MOLDED PARTS CONTAINING THE SAME

(75) Inventor: Mark Lieberman, Bloomfield Hills, MI (US)

(73) Assignee: ACI Technologies, LLC, Flint, MI (US)

( * ) Notice: Subject to any disclaimer, the term of this patent is extended or adjusted under 35 U.S.C. 154(b) by 0 days.

(21) Appl. No.: 10/085,334

(22) Filed: Feb. 28, 2002

Related U.S. Application Data (63) Continuation-in-part of application No. 09/921,773, filed on Aug. 3, 2001, now Pat. No. 6,670,421.

(51) Int. Cl.$^7$ .............................................. C08L 83/04
(52) U.S. Cl. ...................... 525/101; 428/98; 428/475.5; 428/500; 525/106; 525/166; 525/177; 525/179; 525/184; 525/185; 525/207
(58) Field of Search ................................. 525/101, 106, 525/166, 177, 179, 184, 185, 207; 428/98, 475.5, 500; 524/261, 266, 268

(56) References Cited

U.S. PATENT DOCUMENTS

| | | | |
|---|---|---|---|
| 4,410,482 A | * 10/1983 | Subramanian | ............... 264/515 |
| 5,006,601 A | 4/1991 | Lutz et al. | ..................... 525/66 |
| 5,073,590 A | 12/1991 | Abe et al. | ................... 524/449 |
| 5,234,993 A | 8/1993 | Huynh-Ba | ................... 525/66 |
| 5,602,200 A | 2/1997 | Wissmann | ................... 525/66 |
| 5,874,176 A | 2/1999 | Kamei et al. | ............ 428/474.4 |
| 6,117,561 A | 9/2000 | Jacquemet et al. | ...... 428/475.5 |

* cited by examiner

*Primary Examiner*—Ana Woodward
(74) *Attorney, Agent, or Firm*—Young & Basile, PC (57) ABSTRACT

A polymeric composition and process for making the same suitable for injection molding processes and procedures containing an olefinic polymer component selected from at least one a group which includes polyalkylenes, copolymers of polyalkylenes and a non-olefinic thermoplastic. The non-olefinic and olefinic polymeric components are present in random orientable locations in the initial polymeric composition. When injection molded against a temperature gradient, the resulting workpiece composed of the composition has distinctive regions of elevated non-olefinic concentration proximate the outwardly oriented surface and distinctive regions of elevated olefinic polymeric concentration proximate to interior regions of the workpiece. The non-olefinic thermoplastic may be at least one of thermoplastic polyamides, thermoplastic polyolefins and thermoplastic polycarbonates.

19 Claims, 2 Drawing Sheets

INTRODUCING POLYAMIDE MATERIAL INTO COMPOUNDING VESSEL

AGITATING POLYAMIDE MATERIAL AND ELEVATING TEMPERATURE

ADDING POLYOLEFIN MATERIAL TO POLYAMIDE RESIDENT IN COMPOUNDING VESSEL

MAINTAINING POLYAMIDE AND POLYOLEFIN AT SECOND TEMPERATURE TO MELT POLYOLEFIN

COMPOUNDING MATERIAL TO ACCOMPLISH RANDOM DISPERSION OF DISCRETE REGIONS OF POLYAMIDE IN POLYOLEFIN MATRIX

COOLING DISPERSION TO SOLIDIFICATION TEMPERATURE

OLEFIN-BASED THERMOPLASTIC ALLOY, PROCESS FOR MAKING THE SAME AND MOLDED PARTS CONTAINING THE SAME

CROSS REFERENCE TO APPLICATION

The present application is a continuation-in-part of U.S. Ser. No. 09/921,773 filed Aug. 3, 2001, now U.S. Pat. No. 6,610,421 the entire contents of which are incorporated herein in its entirety.

FIELD OF THE INVENTION

The present invention relates to a unique polymeric material composed of olefinic constituents such as polyalkylenes and other non-olefinic constituents and methods for making the same. More particularly, the present invention pertains to polymeric materials which contain polyolefins such as polyalkylenes and other non-olefinic constituents in an alloyed relationship which permits orientation of polyolefin and non-olefinic polymeric constituents as a result of molding processes. Even more particularly, this invention pertains to alloys made up of polyolefins such as polypropylene and non-olefinic thermoplastics such as polyamides, polyesters derived from ethylene glycol, and polycarbonates heretofore considered to have less than optimal compatibility. Finally, the present invention pertains to molded parts having a unique orientation of polyolefin in a central core and the at least a portion of the core or an outer skin or region rich in non-olefinic polymeric material which differs from the polyolefin central core.

BACKGROUND

The need and demand for molded polymeric component parts is significant. Such component parts provide functional versatile, low-cost, lightweight solutions for many elements in a myriad of products from automotive vehicles to construction components to decorative objects. Various molding techniques exist to process various thermoplastic and thermosetting materials into finished components. The choice of polymeric material is generally governed by factors which include the type of molding process to be employed and the physical characteristics which the finished component must possess. Such characteristics can include, but are not limited to, strength, flexibility, weatherability and resistance to degradation upon prolonged exposure to harmful elements such as UV light, ozone etc. Desirable material characteristics can also include the ability to withstand repeated fluctuations in temperature as well as upper and lower service limits compatible for the use to which the components are to be put. Additionally, there is a great demand for moldable polymeric compounds and formulations which will provide desirable characteristics such as scratch resistance, abrasion resistence, and optimum paintablity normally attributed to the "harder" melt processible thermoplastic polymeric materials together with overall flexibility typically found in "softer" polymeric compounds.

All too often, the compromise between desired physical characteristics is one which cannot be satisfactorily achieved or can only be attained in a cost intensive and or labor intensive manner. For instance, in situations where external surface scratch resistance and all-body flexibility and/or general strength is required, it has generally been thought that multi-layer laminates of various polymeric materials may be the solution. Other solutions include the use of various paints, lacquers or other surface tougheners applied in bonded relationship to the softer substrate in order to provide characteristics such as enhanced scratch resistance and the like. This is problematic as such applied coatings and/or bonded laminates require careful surface preparation and are susceptible to scratching or peeling over the life of the part or component.

Compositions have been proposed which include two or more different polymeric compositions in order to obtain desirable combinations such as scratch and mar resistance, paintability, etc. Unfortunately, multi polymer compositions often exhibit undesirable flow characteristics during melt processing and yield finished parts with undesirable performance characteristics. Further, there is the undesirabily high cost of decoration or multi-step painting or processing. These undesirable surface performance characteristics include, but are not limited to, delamination of some or all of the surface layer of the part produced.

There are also situations in which it is desirable to prepare polymeric parts which are colored or pigmented. This can be problematic in situations where multipolymer compositions are employed. In many situations, polymeric parts or components made through injection molding processes exhibit uneven pigmentation. This phenomenon can be due to uneven or inappropriate polymer flow characteristics during part formation. The resulting molded part can exhibit undesirable discontinuities in pigmentation along knit-lines and from eddies formed at mold depressions and the like. In other situations, it is desirable to provide a polymer which can incorporate specialty aesthetic additives such as metal flake in a pigmented or non-pigmented substrate in a manner which is aesthetically homogeneous and which does not materially impair or compromise key functional characteristics of the material such as strength and durability.

In order to process dissimilar polymers to form polymeric compounds suitable for use in molding processes such as injection molding, it has heretofore been considered necessary to employ significant quantities of compatibilizing agents such as maleic anhydride functionalizing agents to functionalize the polymeric components and facilitate bonding. These materials have been considered mandatory to permit the two or more dissimilar polymeric materials to blend effectively in initial formulation steps and to process effectively in the subsequent part formation steps such as injection molding processes.

Historically, it was considered common knowledge that omission of or significant decrease in the concentration of such functionalizing agents would result in the failure of the two or more materials to melt process in a compatible manner. It was believed that functionalizing agents such as maleic anhydride permitted polymeric materials having vastly different properties such as melt temperature and the like to blend, melt and reform effectively upon subsequent heating and processing. Such functionalizing agents are typically so effective that an essentially uniform polymeric blend results. This compromises any potential for ordered orientation of individual polymer components in subsequent molding or polymer forming operations.

Thus it would be desirable to provide a melt processible polymeric composition which is composed of two or more polymeric components which, when subjected to molding operations such as injection molding or extrusion, provides a finished product or part which exhibits at least one of the following characteristics:
  a) scratch and mar resistance in the surface of the finished product produced from the material;
  b) surface characteristics of the finished part which contribute to direct paintability, i.e. adhesion of paint and/or other applied materials to the surface of the produced part without requiring the use of an adhesion promoter and/or a tie coat c) mold in color capability, i.e. the ability to integrate coloring agents such as pigments into the material at a point prior to molding or melt processing into the finished part;

d) enhanced exterior weatherability;

e) enhanced or elevated resistance to heat and/or other environmental hazards;

f) enhanced flexibility; and g) enhanced impact resistance.

It is also desirable that the melt processible polymeric material thus formed be one which retains key characteristics of the individual component materials upon processing and mold formation. It is also desirable to provide a melt processible polymeric material which can contain at least two essentially non-compatible polymeric materials in orientable alloyed relationship to each other. Finally it is desirable to provide a polymeric composition which permit or promotes migration of one polymer relative to another during the molding or other melt processing operations such as extrusion.

SUMMARY

The present invention is directed to a polymeric composition which is suitable for use in injection molding processes and procedures. The polymeric composition contains, as a major portion, an olefinic polymer component selected from at least one a group which includes polyalkylenes, copolymers of polyalkylenes, in which at least one monomeric unit of the polymer contains between 2 and 6 carbon atoms. The olefinic polymer component employed as the major portion can also include suitable organic or inorganic fill material such as glass, KEVLAR, talc, mica, conductive or nonconductive graphite, conductive or nonconductive carbon black and the like as desired or required to obtain desired rigidity and/or impact resistance.

The polymeric composition of the present invention contains, as a minor portion, a non-olefinic thermoplastic polymer which is selected from a group which includes at least one of thermoplastic polyamides and polyamide derivatives, thermoplastic polycarbonates, thermoplastic rubbers and thermoplastic polyesters derived from ethylene glycol. Examples of suitable polyamides include, but are not limited to, polyamide 6, polyamide 6,6, polyamide 11 and polyamide 12. Examples of suitable thermoplastic polyesters derived from ethylene glycol include polybutylene terephthalate, polyethylene terephthalate and polytetramethylene terephthalate. Examples of suitable thermoplastic polycarbonates components include linear, branches and aromatic polycarbonates which may optionally be compounded with materials such as ABS. Suitable amorphous thermoplastic include, but are not limited to, acrylonitrile-butadiene-styrene (ABS) and the like as well as thermoplastic alloys having the same or similar attributes. The olefininc and non-olefinic polymeric components are present in discrete random orientable regions in the initial polymeric composition.

The polymeric composition of the present invention possesses unique orientation characteristics when injection molded against a temperature gradient such that the resulting workpiece has distinctive regions of elevated olefinic polymeric concentration proximate to interior regions of the workpiece while the region proximate to the outwardly oriented surface of the resulting molded workpiece is characterized by elevated concentrations of the minor portion of the alloy. Thus, the region proximate to the outer region will contain elevated levels of non-olefinic thermoplastic such as polyamide, thermoplastic polyester, or thermoplastic rubber, or polycarbonate, while the interior regions will contain elevated concentrations of polyolefin.

The polymeric composition of the present invention is a universal molding polymer which produces work pieces which, when produced in a method which included exposure to a heat gradient such as occurs in injection molding or various extrusion processes, exhibit unique characteristics of resistance to abrasion and scratches as well as suitable impact modification. The universal molding polymer is one which permits effective and aesthetic molding in color with optional visual enhancements, such as integration of metal flake or the like. The universal molding polymer of the present invention provides manufacturers with the ability to mold parts with a variety of physical and/or aesthetic characteristics that heretofore required the use of polymers having separate functionality and performance characteristics. The universal molding composition of the present invention can eliminate the need for molding with multiple resin systems or painting. Thus, the universal molding composition of the present invention is a material which is significantly amenable to integrated recycling and recovery.

BRIEF DESCRIPTION OF THE DRAWINGS

The description herein makes reference to the accompanying drawings wherein like reference numerals refer to like parts throughout the several views, and wherein.

DETAILED DESCRIPTION

The present invention is predicated on the unexpected discovery that a melt processible thermoplastic composition can be prepared which contains at least two thermoplastic materials which have heretofore been considered unable to be combined in a composition suitable for melt processes such as injection molding (herein referred to as "molding") and extrusion. More specifically, the present invention is predicated on the discovery that at least two distinct thermoplastic materials can be successfully compounded in a combination which can be advantageously employed in melt processing operations such as injection molding and extrusion. Such polymeric materials can retain identifiable characteristics of the ingredient components and exhibit orientation of the identifiable components during the subsequent molding procedure.

The thermoplastic composition of the present of the present invention contains a major portion of an thermoplastic olefinic polymer component and a minor portion of a thermoplastic non olefinic polymer present in an alloyed relationship therewith.

As used herein, the term "alloyed relationship" and "alloy" are taken define a randomly oriented dispersion of the minor component in the major component in a manner which facilitates the orientation of the respective component relative to one another upon the application of external forces such as pressure and heat. In the alloyed relationship of the major and minor components in the composition of the present invention, the at least two respective materials exhibit little significant inter-component cross linking or bonding between one another. Rather, it is theorized that the major and minor component are present in an amorphous amalgam-like state in which the minor component resides in discrete microcells within the major component matrix.

As used herein, the term "non-olefinic polymer" is broadly construed as a thermoplastic material which lacks significant olefinic qualities but can be successfully processed with polyolefins. More specifically, the non-olefinic polymeric component is at least one from the group which includes thermoplastic polyamides, thermoplastic polycarbonates, and thermoplastic polyesters derived from ethylene glycol.

The olefinic polymer employed as the major component is a material selected from at least one of polyalkylenes and copolymers of polyalkylenes. Such materials are contemplated to include polyalkylene homopolymers as well as copolymeric materials which contain polyalkylene constituents. Such materials are broadly recognized in the art of injection molding as thermoplastic polyolefins (TPOs). In the polymeric composition and the process of the present invention, at least one alkylene monomeric unit which makes up the homopolymeric or copolymeric group, preferably, contains 2 to 6 carbon atoms in branched or unbranched monomeric units, with alkylene monomers having two, three or four carbon atoms being preferred and polymers having at least some propylene groups being most preferred.

Polyolefins suitable for use in the compositions of the invention include non-polar thermoplastic, crystalline or semi-crystalline polyolefin homopolymers and copolymers. They are prepared from monoolefin monomers having 2 to 6 carbon atoms, such as ethylene, propylene, 1-butene, isobutylene, 1-pentene and the like, with ethylene, propylene and mixtures thereof being preferred. The polyethylene can be low density, ultra-low density or high density material. The term polypropylene includes homopolymers of propylene as well as reactor copolymers of polypropylene which can contain about 1 to about 20 weight percent of ethylene or various-olefin comonomer of 4 to 16 carbon atoms, and mixtures.

Typically, the polymeric composition and process of the present invention utilize polypropylene homopolymers and/or copolymers of polypropylene with the propylene. It is contemplated that the olefinic component include polypropylenes and/or copolymers of polypropylene of various molecular weights either alone or in combination with the only stipulation being that the polypropylene material be capable of processing in the manner to be described subsequently and can be successfully utilized in the injection molding processes contemplated in the present disclosure.

It is to be understood that, by this disclosure, it is contemplated that the thermoplastic polyolefin, or more particularly, the thermoplastic polypropylene scan be present as a homopolymer. As used herein the term "homopolymer" is taken to means a polymeric material derived from a single monomer. It is also contemplated that the thermoplastic polyolefin, or more particularly, the thermoplastic polypropylene, may be present as a copolymer. As used herein the term "copolymer" is taken to means a polymeric material which is derived by the polymerization of two or more dissimilar materials. It is contemplated that the polymeric material may be the result of copolymerization of propylene with polypropylene, other olefins or other materials which will yield a resulting polymeric compound having characteristics suitable for incorporation in the present invention.

The olefinic compound of choice will typically be one which has a melt flow index below that of the non-olefinic thermoplastic component employed in the composition. The deferential between melt flow indices for the respective polyolefin and non-olefinic component will be typically be dictated by the end use to which the polymeric composition of the present invention is to be put, i.e. the type of part and molding operation undertaken. Thus, the differential between the melt flow indices may be as little as one or as great as required to achieve migratory orientation of the two respective materials in the forming operation. For example, in certain applications, a polyolefin having a melt flow index between 8 and 12 might be employed in combination with a non-olefinic thermoplastic having a melt flow index between 20 and 28. The polyolefin may have a melt flow index typical for that material provided it is sufficiently below the melt flow index of the non-olefinic thermoplastic to permit migratory orientation of polyolefin relative to non-olefinic thermoplastic upon molding or extrusion operations. Specific differentials in melt flow index will be discernable to the skilled artisan familiar with injection and/or extrusion are in view of the present disclosure.

In the present invention, the polymeric composition contains a major portion of the polyolefin compound. As the term "major portion" is used herein, it is defined as an amount greater than the amount of any other compound employed in the polymeric composition. The amount of polyolefin component employed in the polymeric compound of the present invention is that amount which will impart polyolefinic characteristics to the core region of the molded workpiece so formed and will permit the expression of characteristics typically associated with non-olefinic thermoplastic materials in the region proximate to the outwardly oriented surface of the workpiece. Preferably, the olefinic compound is present in an amount between 40 to 99% by weight with amounts between 51 and 95% by material weight being preferred and with an amount between 65 and 85% being most preferred. It is to be understood that, in situation where the olefinic component is present in amounts less than 51% of the total compositional weight, the olefinic component constitutes the largest single component and is present in concentrations greater than the non-olefinic component to be discussed subsequently.

The polymeric composition of the present invention also contains a minor portion of a non-olefinic thermoplastic. The non-olefinic component typically has a higher melt temperature than the olefinic component. The non-olefinic thermoplastic component is typically selected from a group which includes at least one of thermoplastic polyamides, thermoplastic polyesters derived from ethylene glycol, thermoplastic polycarbonates and various amorphous commodity resins such as acrylonitrile-butadiene-styrene copolymer (ABS) acrylonitrile-styrene (AS) polymethyl methacrylate (PMMA) and the like. These materials can be used individually or in suitable admixture to provide performance characteristics such as scratch and abrasion resistance, and to facilitate the molding and color. Thus the non-olefinic material employed can be used in any aforementioned combination. It can also be combined or complexed with compatible materials in suitable amounts. Examples of such materials include, but are not limited to, materials such as acrylonitrile-butadiene-styrene (ABS) and the like with the provision that the complexing or combination does not adversely effect the performance or processing of the polymeric alloy of the present invention.

Suitable thermoplastic polyamides (nylons) include crystalline or resinous polymers (including copolymers and terpolymers) having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines are contemplated within the purview of this invention. Both fiber-forming and molding grade nylons are suitable, with molding grades being preferred.

Previously mentioned examples of such polyamides include polycaprolactam (nylon 6), polylauryllactam (nylon 12), polyhexamethylenedipamide (nylon 6,6). Also contemplated for use in the present invention are polyhexamethyleneazelamide (nylon 6,9), polyhexamethylenesebacamide (nylon 6,10), polyhexamethyleneisophthalamide (nylon 6,10) and the condensation product of 11-aminoundecanoic acid (nylon 11) polytetramethyleneadipamide (nylon 4,6). Other polyamides which may be used include polyhexamethyleneazelaamide (nylon 6,9), polyhexamethylenesebacamide (nylon 6,10), polyhexamethylenedodecanediamide (nylon 6,12), and polydodecanemethylenedodecanamide (nylon 12,12).

Additional examples of satisfactory polyamides (especially those having a softening point below 275° C.) are described in Kirk-Othmer, Encyclopedia of Chemical Technology, 3d edition, vol. 18, pages 406409, and Encyclopedia of Polymer Science and Engineering, 2d edition, vol. 11, pages 445450. Commercially available thermoplastic polyamides may be advantageously used in the practice of this invention, with linear crystalline polyamides having a softening point or melting point between 160° C. and 260° C. being preferred. Polyamides typically have a molecular weight above 5,000 with a weight between 5,000 and 70,000 being preferred and a weight between 10,000 and 65,000 being most preferred. The preferred thermoplastic polyamide polymer employed as a minor component in the present invention is selected from at least one of nylon 4,6, nylon 6, nylon 6.6, nylon 11, and nylon 12, with nylon 6 being most preferred.

The nylon material employed may be virgin material. It is also contemplated that the nylon employed may contain at least a portion of reclaimed and recycled material in an amount between 0.1 and 99% of the polyamide material. The reclaimed and recycled material can be derived from either pre-consumer or post-consumer sources as would be available and known to the skilled artisan.

It is to be understood that, by this disclosure, it is contemplated that the thermoplastic polyamide, can be present as a homopolymer or suitable copolymer as these terms have been defined in the present application. Representative characteristics of thermoplastic polyamide materials suitable for use in the present invention are those typically associated with melt processable polyamides. As indicated previously, the polyamide of choice will have a melt flow index greater than the polyolefin of choice. In certain end use applications, it is envisioned that the differences in melt flow indices may be as little as 1. Other greater differences in melt flow index would be employed depending on the part formation process to be employed. As a non-binding example, it is envisioned that lower melt flow index differentials could be utilized in parts having less mass or in parts prepared by extrusion processes. Greater melt flow index differentials could be employed in formation of parts utilizing certain injection molding processes as would be known to the skilled artisan upon reading this specification.

As indicated previously, the polymeric composition of the present invention contains a minor portion of the polyamide thermoplastic. As the term "minor portion" is used herein, it is defined as an amount less than the amount of the compound employed as the major polymeric constituent in the polymeric composition. The amount of polyamide component employed in the polymeric compound of the present invention is that amount which will impart signature physical characteristics to the region proximate to the outer surface of the resulting work piece produced by the injection molding process utilizing this material, typically surface hardness, scratch resistance and durability.

Broadly construed, it is contemplated that the polymeric composition of the present invention will contain sufficient quantities of polyamide to impart the signature characteristics required. Broadly construed, the polyamide content may be any amount up to and including 49% by material weight. Preferably the high melt polymer compound is present in an amount between 1 and 49% by material weight with an amount between 10 and 35% by material weight being more preferred and an amount between 15 and 30% by material being most preferred.

The polymeric composition of the present invention may include as a minor portion thermoplastic polyesters derived from ethylene glycol. Suitable thermoplastic polyesters derived from ethylene glycol are typically a polymeric terephthalate material. Suitable materials include polybutylene terephthalate, polyethylene terephthalate, polytetramethylene terephthalate and the like. Preparation and characterization of such materials is known and is discussed in references such as Whinfield et al., U.S. Pat. No. 2,465,319 and in Pengilly, U.S. Pat. No. 3,047,539, as well as U.S. Pat. No. 3,644,574 and in Kirk-Othmer, Encyclopedia of Chemical Technology, Second Edition, Vol. 16, pp. 159 et. seq. (1968), all disclosures being incorporated herein by reference.

The thermoplastic polyester material employed may be virgin material. It is also contemplated that the thermoplastic polyester employed may contain at least a portion of reclaimed and recycled material in an amount between 0.1 and 99% of the polyester material. The reclaimed and recycled material can be derived from either pre-consumer or post-consumer sources as would be available and known to the skilled artisan.

Representative characteristics of thermoplastic terephthalate materials suitable for use in the present invention are those typically associated with melt processible polymeric terephthlates. As indicated previously, the material of choice will have a melt flow index greater than the polyolefin of choice. In certain end use applications, it is envisioned that the differences in melt flow indices may be as little as 1. Other greater differences in melt flow index would be employed depending on the part formation process to be employed.

As indicated previously, the polymeric composition of the present invention contains a minor portion of the non-olefinic thermoplastic polyester component. As the term "minor portion" is used herein, it is defined as any amount less than the amount of the compound employed as the major portion in the polymeric composition of the present invention. The amount of terephthalate component employed in the polymeric compound of the present invention is that amount which will impart signature physical characteristics to the region proximate to the outer surface of the work piece produced by the injection molding process utilizing this material, typically surface hardness, scratch resistence and durability.

Broadly construed, it is contemplated that the polymeric composition of the present invention will contain sufficient quantities of thermoplastic polyester component to impart the signature characteristics required. Broadly construed, the thermoplastic polyester content may be any amount up to and including 49% by material weight. Preferably the terephthalate polymer compound is present in an amount between 1 and 49% by material weight with an amount between 10 and 35% by material weight being more preferred and an amount between 15 and 30% being most preferred.

The polymeric composition of the present invention may include as a minor portion thermoplastic polycarbonate material. The polycarbonate material successfully employed herein may be either a straight or branched chain polycarbonate such as those typically employed in the molding industry. The polycarbonate material of choice may be one which is preferable a linear or branched material. A degree of aromaticity may be tolerated provided that the material will function within the parameters generally outlined in the present invention. Typically materials with aromatic functionality are prepared by methods such as reacting a dihydric phenol with a carbonate precursor, such as phosgene, a haloformate or a carbonate ester such as is described in U.S. Pat. No. 4,778,853 to Belfour. Preparation of preparation of polyester-carbonates which may be employed in the compositions of the present invention is described in U.S. Pat. Nos. 3,030,331; 3,169,121; 3,207,814; 4,194,038 and 4,156,069. Linear and branched polycarbonates are well known and are discussed in references such as U.S. Pat. Nos. 3,155,683; 3,386,954; 3,274,214; 3,422,119. Suitable materials are widely available as articles of commerce. Polycarbonate/ABS materials are also known and are discussed and described variously in references such as, for example, U.S. Pat. No. 5,393,835 to Eckel. The aforementioned disclosures are incorporated herein by reference.

The thermoplastic polycarbonate material employed may be virgin material. It is also contemplated that the polycarbonate employed may contain at least a portion of reclaimed and recycled material in an amount between 0.1 and 99% of the polyester material. The reclaimed and recycled material can be derived from either pre-consumer or post-consumer sources as would be available and known to the skilled artisan.

Representative characteristics of thermoplastic polycarbonate materials suitable for use in the present invention are those typically associated with melt processible polymeric polycarbonates. As indicated previously, the material of choice will have a melt flow index greater than the polyolefin of choice. In certain end use applications, it is envisioned that the differences in melt flow indices may be as little as 1. Other greater differences in melt flow index would be employed depending on the part formation process to be employed.

As indicated previously, the polymeric composition of the present invention contains a minor portion of the thermoplastic polycarbonate component. As the term "minor portion" is used herein, it is defined as an amount less than the amount of the compound employed in major portion in the polymeric composition. The amount of polycarbonate component employed in the polymeric compound of the present invention is that amount which will impart signature physical characteristics to the region proximate to the outer surface of the work piece produced by the injection molding process utilizing this material, typically surface hardness, scratch resistance and durability.

Broadly construed, it is contemplated that the polymeric composition of the present invention will contain sufficient quantities of thermoplastic polycarbonate component to impart the signature characteristics required. The thermoplastic polycarbonate component content may be any amount up to and including 49% by material weight. Preferably the polycarbonate polymer compound is present in an amount between 1 and 49% by material weight with an amount between 10 and 35% by material weight being more preferred and an amount between 15 and 30% being most preferred.

It is to be understood that the non-olefinic polymer component can be either polyamide, polymeric terephthalate, or polycarbonate material individually. It is also contemplated that the non-olefinic polymer can be a suitable mixture of any of the aforementioned components. Additionally, it is contemplated that the non-olefinic polymer component may have various other materials present therein incorporated either by graft polymerization or other suitable integration provided that such additional components which will not adversely affect functionality in the present application.

In the preferred embodiment, the thermoplastic alloy material may be present initially in any physical form which will permit or promote subsequent injection molding processes. Typically, the material is present as a granular or pelletized solid in which the minor polymeric portion is randomly dispersed within the major polymeric portion. Thus, the composition is a granular or pelletized solid polyolefin matrix having micron or submicron sized non-polyolefinic polymeric particles dispersed therein.

The universal molding compound of the present invention may also contain additives which impart increased impact resistance, UV resistance and the like. Thus the part which is formed from the material of the present invention wilt exhibit many important advantageous characteristics which can include enhanced scratch and mar resistance, increased paintability, mold in color capability, enhanced exterior weatherability and enhanced or elevated resistance to heat, to name a few.

It has been found, quite unexpectedly, that incorporation of small amounts of materials which are hereafter referred to as migratory compatibilizers will enhance the characteristics previously enumerated regarding the performance of the novel polymeric composition. As used herein, the term "migratory compatibilizer" is defined as an organic additive or additives which may impart limited functionality to at least one of the major and/or minor polymeric components present in the composition of the present invention. Without being bound to any theory, it is believed that the migratory compatibilizer or compatibilizers function to permit the minor polymeric component to be maintained in orientable relationship in a matrix relative to the major polymeric portion material in the resulting polymeric composition. In the polymeric composition of the present invention, the minor polyamide polymeric component is maintained in discrete "islands" in the polyolefin matrix prior to molding operations. The migratory compatibilizer may also advantageously facilitate orientation of the components upon external application of an orienting force such as heat. Additionally the migratory compatibilizer may assist in the maintenance of discrete islands in the matrix prior to processing.

These migratory compatibilzers also appear to serve as an organic interstitial agents acting as binding agents between olefinic component and non-olefinic compound during injection molding processes. As such, they serve as "platelets" orienting themselves at interstitial junctions between the major and minor polymeric components and providing adjunct binding sites suitable for interaction with the polymeric component.

Suitable primary migratory compatibilizers include classes of silicone oils (also referred to as siloxane or silane oils). Suitable materials are compatible with the processing parameters of the formation and molding processes of the present invention. Such materials are generally known in the art relevant to thermoplastic polyolefin processing. However it has been unexpectedly discovered that such materials, when employed in the composition of the present invention and processed by injection molding or extrusion processes, will exhibit interstitial migration patterns. By the term "interstitial migration patterns" it is meant that the migratory compatibilizer will migrate and concentrate at locations between olefinic and non-olefinic polymeric constituents, and more particularly, at locations at the interface between regions of olefinic polymeric concentration and non-olefinic polymeric concentration.

Thus, the migratory compatibilizer of choice will be one having sufficient functionality to align and orient between regions of non-olefinic polymer such as polyamide-rich regions and polyolefin-rich regions when the compounded material has been subjected to injection molding procedures. Without being bound to any theory, it is believed that migratory compatibilizers such as siloxane oils concentrate in this gradient between the outer skin rich in non-olefinic polymer and ril the polyolefin-rich interior during the molding process to provide an interstitial mechanical and/or quasi-chemical bonding region in and at the gradient interface between the outer skin rich in non-olefinic polymer and the polyolefin-rich interior.

Primary migratory compatibilizers contemplated herein are preferably organic compounds having organosiloxane functionalities commonly referred to as silicone oils. The organosiloxane material of choice preferably has a viscosity at 25° C of about 30–100,000 centi-stokes, preferably from 5,000 to 30,000 centi-stokes, and most preferably from 8,000 to 25,000 centi-stokes. Materials between 30 and 1,000 centi-stokes may preferably may preferably include, for example, dimethyl-silicone oil, methylphenylsilicone oil, alpha-methyl-styrene-modified silicone oil, chlorophenyl-silicone oil, and fluorinated silicone oil. Examples of silicone oils having higher viscosity values include silicone oils containing a modified siloxane bond, such as polymethylphenylsiloxane, olefin-modified silicone, amide-modified silicone, polydimethylsiloxane, amino-modified silicone, carboxyl-modified silicone, alpha-methylstyrene-modified silicone, polyether-modified silicone modified by polyethylene glycol or polypropylene glycol, olefin/polyether-modified silicone, epoxy-modified silicone, amino-modified silicone and alcohol-modified silicone.

The composition of the present invention may also contain a secondary migratory compatibilizer. The secondary migratory compatibilizer is preferably an organic material which, when added to at least one of the polymeric components, begins the process of rendering the respective materials as migratory compatible. Suitable materials include at least one of maleic anhydride, itaconic anhydride, citraconic anhydride, bicyclo[2,2, 1]hepta-5-ene-2,3-dicarboxylic acid anhydride (himic acid anhydride; NBDA), monoethyl maleate, monomethyl fumarate, oil monomethyl itaconate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate, etc. Of these, maleic anhydride is most preferably used.

The secondary migratory compatibilizer may also be a suitable polymer incorporating at least one of the enumerated materials. Typically aromatic alkene maliec anhydride rubbers can be employed. Suitable materials include materials such as a copolymer of styrene and maleic anhydride, optionally modified with other monomers and polymers (generally referred to as SMA polymers). Thus the styrene and maleic anhydride can be co-reacted with monomers, such as methyl methacrylate, or polymers, such as polybutadiene. The co-reacted polymers can be blended with other polymers such as ABS polymers (graft-copolymer of acrylonitrile and styrene with polybutadiene and blends of acrylonitrile butadiene copolymer with styrene acrylonitrile copolymer). Suitable SMA polymers are disclosed in U.S. Pat. No. 3,509,110, the disclosure of which is incorporated herein by reference. While the patent is directed to a particular process for making the SMA polymer, the patent is appropriate for disclosing the basic SMA polymer composition. Thus, the SMA polymers, basically comprise a copolymer of a vinyl aryl monomer and an ethylenically unsaturated dicarboxylic acid. As shown in the patent the polymer may be formed by reacting the vinyl aryl monomer with a half ester of an ethylenically unsaturated dicarboxylic acid.

Aryl vinyl monomers useful in the making of the SMA polymers include styrene, ortho-methylstyrene, meta-methylstyrene, para-methylstyrene, ethylstyrene, dimethylstyrene, divinylbenzene, alpha-methylstyrene, para-methoxystyrene, para-chlorostyrene, 2,4-dichlorostyrene, 2,5-dichlorostyrene, parabromostyrene, alpha-methyl-p-methylstyrene, para-isopropylstyrene, vinylnaphthalene and the like. Mixtures of two or more of these aryl vinyl monomers may be used if desired.

The half esters of an ethylenically unsaturated dicarboxylic acid are prepared from the following acids: maleic acid, fumaric acid, itaconic acid, citraconic acid, mesaconic acid, ethyl maleic acid, methyl itaconic acid, chloromaleic acid, dichloro-maleic acid, bromomaleic acid, dibromomaleic acid and the like. The half esters are formed from the ethylenically unsaturated dicarboxylic acid or its anhydride (or mixtures of the same) and the desired alcohol. Suitable alcohols are the primary and secondary alkanols containing up to 6 carbon atoms, such as methyl, alcohol, ethyl alcohol n-propyl alcohol n-butyl alcohol sec-butyl alcohol and n-pentyl alcohol; halogenated alkanols having up to 6 carbon atoms, such as 2,3-dichloro-1-propanol and 2-bromo-1-propanol; arylakyl alcohols such as benzyl alcohol; eyelic alcohols having up to 6 carbon atoms, such as cyclopentanol, cyclohexanol and tetrahydrofurfuryl alcohol; ether alcohols such as 2-butoxy ethanol and the ethyl ether of diethylene glycol; phosphorous containing alcohols such as diethyl monobutanol phosphate; nitrogen containing alcohols such as N—N-dimethyl ethanol amine, and the like.

The aryl vinyl monomer and ester of an ethylenically unsaturated dicarboxylic acid or anhydride are reacted in the preparation of about 50 to 95 weight percent monovinyl aromatic compound with the remainder being acid or anhydride.

Other suitable SMA polymers are prepared in accordance with U.S. Pat. No. 4,278,768, the disclosure of which is incorporated herein by reference. This patent teaches that SMA polymers can be prepared by direct copolymerization of a monovinyl aromatic monomer with an ethylenically unsaturated dicarboxylic acid anhydride by continuous controlled addition of the more reactive anhydride monomer to produce the copolymer of the desired composition. The monovinyl aromatic monomers useful in the copolymers are styrene, alpha-methylstyrene, nuclear-methylstyrenes, ethylstyrene, isopropylstyrene, tertbutylstyrene, chlorostyrenes, dichlorostyrenes, vinylnaphthalene and mixtures of these. Suitable anhydrides are the anhydrides of maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid, and mixtures thereof and the like. The anhydride copolymers may contain from 5 to 50 mole percent of anhydride and 95 to 50 mole percent of monovinyl aromatic monomer.

For the rubber-modified copolymers, the starting copolymers may be any of the above anhydride copolymers into which 5 to 40 percent by weight of one of the known rubbers has been incorporated. The rubbers may be incorporated into the anhydride copolymers by blending, mixing, or copolymerizing the monomers in the presence of the rubber. A method of preparing the rubber-modified anhydride copolymer is that taught in U.S. Pat. No. 3,919,345, wherein a rubber is dissolved in monovinyl aromatic monomer, polymerization initiated and ethylenically unsaturated dicarboxylic acid anhydride is added continuously to the polymerizing mixture at a rate sufficient to maintain the concentration of anhydride low.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof. Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Other suitable SMA polymers are prepared as described in U.S. Pat. No. 4,311,806, the disclosure of which is incorporated herein by reference. This patent teaches rubber-modified copolymers of a vinyl aryl monomer and unsaturated dicarboxylic acid anhydride. The basic polymer may also include a termonomer selected from acrylates and methacrylates and unsaturated nitrites wherein the relative proportion of monomers are 50 to 85 percent of the vinyl aryl monomer, 15 to 30 percent of the anhydride and 0 to 20 percent of the termonomer wherein the monomers are polymerized in the presence of 5 to 25 percent by weight of a rubber having a glass transition temperature below 0° C. The present invention also provides for blending such SMA polymers with graft copolymer of from 20 to 40 percent by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

Styrene is preferably used in forming these polymers, but the styrene can be replaced in whole or in part by other vinyl aromatic monomers such alpha methyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. The termonomer, where present is most preferably methyl methacrylate.

The rubber is conventionally a diene rubber such as polybutadiene or a butadiene based block or radial-block rubber. Other rubbers such as EPDM rubber, polypentenamer, polyisoprene, polychloroprene, polyacrylate rubbers and the like can, if desired, also be used.

Rubber modified copolymers are prepared by polymerizing the monomers in the presence of the rubber in such a way that a uniform copolymer of the polymerizing monomers is grafted on to the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354. The optional additional polymer component used with the SMA polymer is typically an ABS or MBS type polymer such as a diene rubber substrate grafted with styrene and either acrylonitrile, methyl methacrylate or a mixture of these monomers. However the rubber need not be the conventional polybutadiene or butadiene/styrene copolymer since any rubber with a glass transition temperature below 0° C. can be used. Such rubbers include those which may provide the substrate for the SMA polymer described above.

The secondary migratory compatibilizer may also be a modified olefin polymer such as an acid modified propylene polymer or an acid modified ethylene polymer. The base polymer for the modified propylene can a homopolymer, a random copolymer, a block copolymer or a toughened polymer or a filled polymer of any of the above described polypropylenes. Homopolymers and copolymers are preferred most. The acid modified polyolefin may be is graft modified with a suitable amount of a carboxylic acid or a derivative thereof, with maliec anhydride being most preferred. The grafting of the polyolefin may be carried out in the melt state, in solution or in suspension as described in the state-of-the-art literature.

The composition of the invention may also include reinforcing and non-reinforcing fillers, plasticizers for the engineering resin and polyolefin, antioxidants, stabilizers, extender oils, lubricants, antiblocking agents, antistatic agents, waxes, foaming agents, pigments, and flame retardants and other processing aids known in the thermoplastic compounding art. The additives can be added at the beginning of compounding, during the compounding process or adjacent to the completion of the compounding process, provided that the total amount of the additives does not exceed about 50 weight percent, preferably about 25 weight percent, based on the total thermoplastic composition, including additives.

The material of the present invention is preferably produced by a phase inversion process in which the major polymeric portion brought into contact and dispersion with the minor polymeric portion in a thermally agitative compounding process. The thermally agitative compounding process of the present invention has resulted in the unexpected formation of polymeric compound in which a minor amount of a thermoplastic material having a typically high melt viscosity is maintained in discrete dispersed relationship in a thermoplastic material having a typically low melt viscosity. The materials are compounded and maintained relative to one another in a manner which permits reorientation of the respective materials upon remelt and subsequent mold forming processes. The unique compound retains key physical characteristics of the respective component materials while providing an integral molded workpiece.

The process of the present invention by which the universal melt processible thermoplastic polymeric alloy composition suitable for use in injection molding processes is prepared broadly comprises the steps of melt kneading a suitable amount of a melt processible non-olefinic thermoplastic such as thermoplastic polyamide, thermoplastic polycarbonate or thermoplastic polyester derived from ethylene glycol in a suitable compounding vessel. The non-olefinic thermoplastic is brought to and maintained at a temperature sufficient to keep it in an essentially liquid state. The initial temperature achieved is preferably above process temperatures typically permitted for thermoplastic polyolefin.

An amount of melt processible thermoplastic polyolefin is added to the agitating non-olefinic thermoplastic. Addition occurs with melt kneading in a manner which triggers a depression in process temperature to a point at or below the melt temperature of the higher temperature component, i.e., non-olefinic. The melt kneading is such that sufficient energy is imparted to the compounding materials to maintain the compounding materials in a generally fluid state. Compounding continues for an interval sufficient to accomplish random dispersion of discrete regions of non-olefinic thermoplastic in a thermoplastic polyolefin matrix after which the resulting material is permitted to cool and solidify.

Compounding preferredly occurs in a continuous process in a suitable compounding vessel. For melt-kneading, suitable kneading apparatus such as Banbury mixer, extruder, roil mill, or the like can be used. A multi-screw extruder may be advantageously used such as a twin screw extruder having multiple kneading blocks and regions to generate high shear. The type of screw configuration and shear rate is that sufficient to accomplish intimate mixture of the component portions added in the process of the present invention. Such particulars would be understood by the skilled artisan upon reading the present disclosure.

In the process of the present invention, high melt thermoplastic such as polyamide of the specifications enumerated previously is added in a continuous manner into a suitable compounding vessel. Non-olefinic thermoplastic material may be fed into the vessel by any suitable manner which will facilitate mixing. The non-olefinic thermoplastic is preferably introduced as granulated or pelletized material. The non-olefinic thermoplastic material may be heated to facilitate moisture evaporation as required or desired. It is to be understood that such preheating will also facilitate knead melting processes.

In the process of the present invention, the non-olefinic thermoplastic is processed at an initial process temperature sufficient to facilitate knead melting. It is to be understood that the upper boundary for initial process temperature is largely a function of the upper temperature stability limits of the non-olefinic thermoplastic material employed. The lower temperature limit is largely a function of the capability of the mixing elements of the compounding vessel. The thermoplastic polymeric component materials may be heated by any means or combination of means which will achieve the desired elevated temperature level.

In the process of the present invention, the introduced non-olefinic thermoplastic is exposed to the first elevated processing temperature and associated kneading for an interval sufficient to maintain the non-olefinic thermoplastic in an essentially molten state. The temperature maximum experienced by the non-olefinic thermoplastic material is preferably below the temperature at which the material experiences appreciable thermal decomposition.

In the preferred embodiment of the process of the present invention, the non-olefinic thermoplastic is conveyed with suitable melt kneading to a second downstream. At this point, an amount of thermoplastic polyolefin is introduced into contact with the molten non-olefinic thermoplastic. The amount of thermoplastic polyolefin introduced is greater than the amount of non-olefinic thermoplastic resident in the formulating vessel. Typically, the amount of polyolefin to be introduced is an amount greater that a 1:1 ratio (w/w) of polyolefin to non-olefinic polymer, with a weight to weight ratio of greater than 1.2:1 being desirable and a ratio of greater than 2:1 being preferred, the exact ratio to be determined by the end use to which the polymeric composition of the present invention is to be employed.

As indicted previously, the thermoplastic polyolefin of choice is at least one material selected from homopolymers and copolymers having one alkylene monomeric unit which making up the homopolymeric or copolymeric group with the alkylene monomeric functionality, preferably, containing 2 to 6 carbon atoms in branched or unbranched monomeric units, with alkylene monomers having two three or four carbon atoms being preferred and polymers having at least some propylene groups being most preferred. The thermoplastic polyamide of choice is preferably is selected from at least one of nylon 6, nylon 6,6, nylon 11, and nylon 12, with nylon 6 being preferred. Thermoplastic terephthlates include polybutylene terephthalate, polyethylene terephthlates, polytetramethylene terephthlates, etc. Suitable amorphous thermoplastic rubbers such as ABS can also be advantageously employed. Also, polycarbonates can be employed. Various mixtures or combinations of the aforementioned materials are also contemplated.

In order to obtain desired high melt polymer material to polyolefin ratios indicated previously, the polyolefin material can be introduced at a rate and in a manner which permits effective integration of the polyolefin with the non-olefinic thermoplastic. In the process of the present invention, the polyolefin is added in a manner sufficient to depress the process temperature of the molten material contained in the formulating vessel to a temperature below the first elevated temperature. The temperature depression which occurs is one which achieves a second temperature sufficient to maintain the added polyolefin in an essentially molten state in which the added polyolefin can be incorporated into the non-olefinic thermoplastic. The temperature of choice will be one which maintains the non-olefinic thermoplastic and introduced polyolefin in mixable state while minimizing thermal degradation of the introduced polyolefin.

Without being bound to any theory, it is believed that initial portions of the introduced polyolefin may be exposed to transitory temperatures above the generally held optimum melt temperature limits for the polyolefin without experiencing appreciable thermal degradation. It is theorized that this is due, at least in part to the significant mass of polyolefin added to the compounding vessel over a relatively short interval. Preferably, the polyolefin material is added as a granular or pelletized solid. As such, the temperature, mass and relative surface area of the added material serve to provide both transitory and lasting temperature depression events which effectively insulate the polyolefin from thermal events which result in significant thermal degradation.

Introduction of the polyolefin is typically accomplished by suitable means for distributive mixing to assure thorough dispersion of the resident polyamide in the polyolefin being introduced. Thus the knead melting apparatus described previously can be employed in the compounding vessel which will accomplish the desired knead melting and distributive mixing. The polyolefin addition process is preferably accomplished under high shear turbulent conditions to insure the thorough compounding of the two materials.

The compounding event which occurs in the process of the present invention is largely the result of physical compounding. The term "physical compounding" is employed to define and describe the discrete physical relationship of the two respective thermoplastic materials. While the materials remain in a dispersed state relative to one another, the two materials retain discrete regions of identifiable polyamide and polyolefin material with little evidence of chemical bonding between the two thermoplastic materials. The materials are present in dispersed but orientable relationship to one another as a result of the process of the present invention.

Knead melting of molten non-olefinic thermoplastic material and added thermoplastic polyolefin proceeds for an interval sufficient to accomplish random dispersion of discrete regions of non-olefinic thermoplastic in a thermoplastic polyolefin matrix.

In the process of the present invention, once compounding is complete, the resulting material can be cooled to a temperature below which solidification of the resulting thermoplastic compound occurs with appropriate pelletization and the like.

In the preferred embodiment of the present invention at least one suitable migratory compatibilizing agent may be introduced into composition during the compounding process to facilitate the successful compounding of the two polymeric components and to further facilitate migration and orientation of the two polymeric components during subsequent molding and processing operations. In the preferred embodiment the at least one primary migratory compatibilizing agent is introduced into contact with the non-olefinic thermoplastic during the initial compounding stage.

The primary migratory compatibilizing agent is preferably a material such as a silicone oil (sometimes referred to as siloxane oil) which will form platelets. It is theorized that the platelets ultimately will migrate to the interface between the non-olefinic thermoplastic and polyolefin material as orientation progresses during injection molding or extrusion processes. It is further theorized that these primary migratory compatibilizing agents remain essentially non-reactive to with the non-olefinic thermoplastic and polyolefin materials during initial compounding but function in molding or extrusion operations to provide binding regions to which the two components can attach during the orientation upon molding. It is this phenomenon which is referred to as migratory compatibilization.

The primary migratory compatibilizing agent is essentially non-reactive the non-olefinic thermoplastic and subsequently added polyolefin constituents while resident in the compounding vessel and undergoing kneading. The primary migratory compatibilizing agent of choice will be one having sufficient functionality to align and orient between regions rich in non-olefinic thermoplastic and polyolefin-rich regions when the compounded material has been subjected to injection molding or extrusion procedures. Without being bound to any theory, it is believed that the primary migratory agent concentrates in the gradient between the outer skin rich in non-olefinic thermoplastic polymer and the polyolefin-rich interior provides an interstitial mechanical and quasi-chemical bonding region in and at the gradient interface between the outer skin rich in non-olefinic thermoplastic and the polyolefin-rich interior. The primary migratory agent is preferably present in an amount sufficient to promote non-olefinic/polyolefin cohesion. Typically amounts between 0.1 and 5.0 weight % can be successfully employed with amounts between 0.1 and 1.0% being preferred.

When desired, a secondary migratory compatibilizing agent can be introduced and integrated into the composition of the present invention. The secondary migratory compatibilizing agent is typically a material which is classically referred to as a functional compatibilizer and, heretofore has been employed to insure essentially homogeneous integration of one polymeric component relative to another. It has been found, quite unexpectedly that the incorporation of less than functionalizing quantities of a second migratory compatibilizing agent into a the polyamide component prior to the addition of the polyolefin results in effective formation of islands non-olefinic thermoplastic into the polyolefin matrix in a manner which facilitates uniform product flow during injection molding or processing operations such as extrusion. Without being bound to any theory, it is believed that the incorporation of secondary migratory compatibilizing agent in less that optimal functionalizing quantities provides sufficient minimal functionality to enhance migratory distribution while avoiding excess reaction between the functional sites and the associated polymeric components. Thus the amount of secondary migratory compatibilizer employed may range from zero to an amount below the amount typically required for effective functionalization for the associated non-olefinic thermoplastic and polyolefin components.

Figure 1:
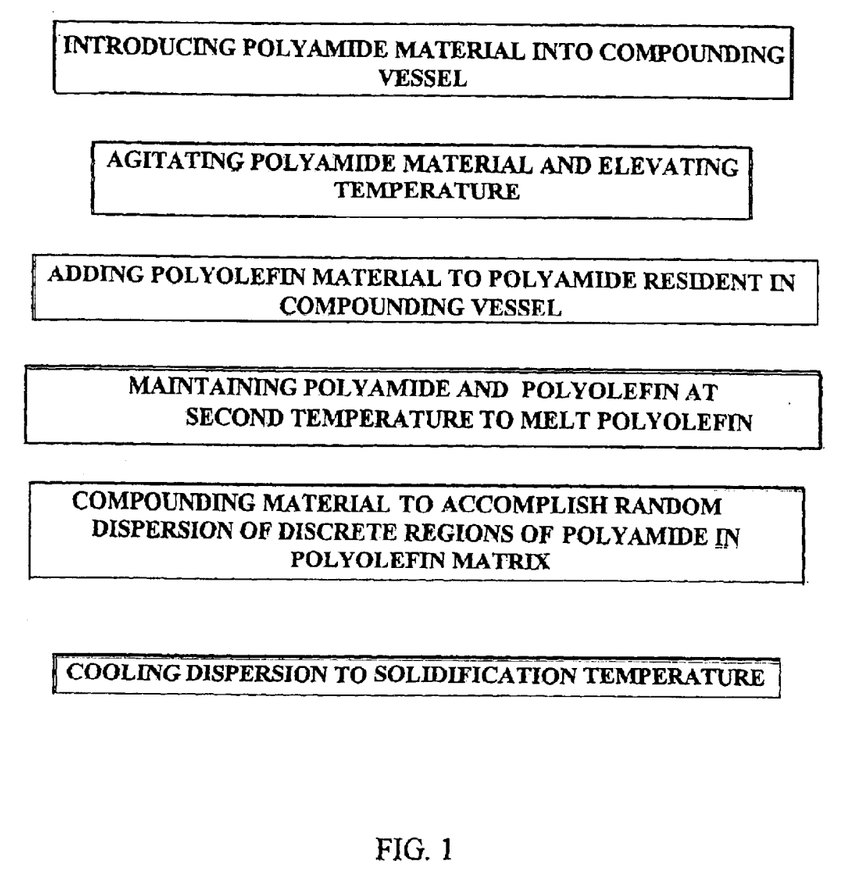
FIG. 1 is a process diagram of the formulation method of the present invention.
Figure 2:
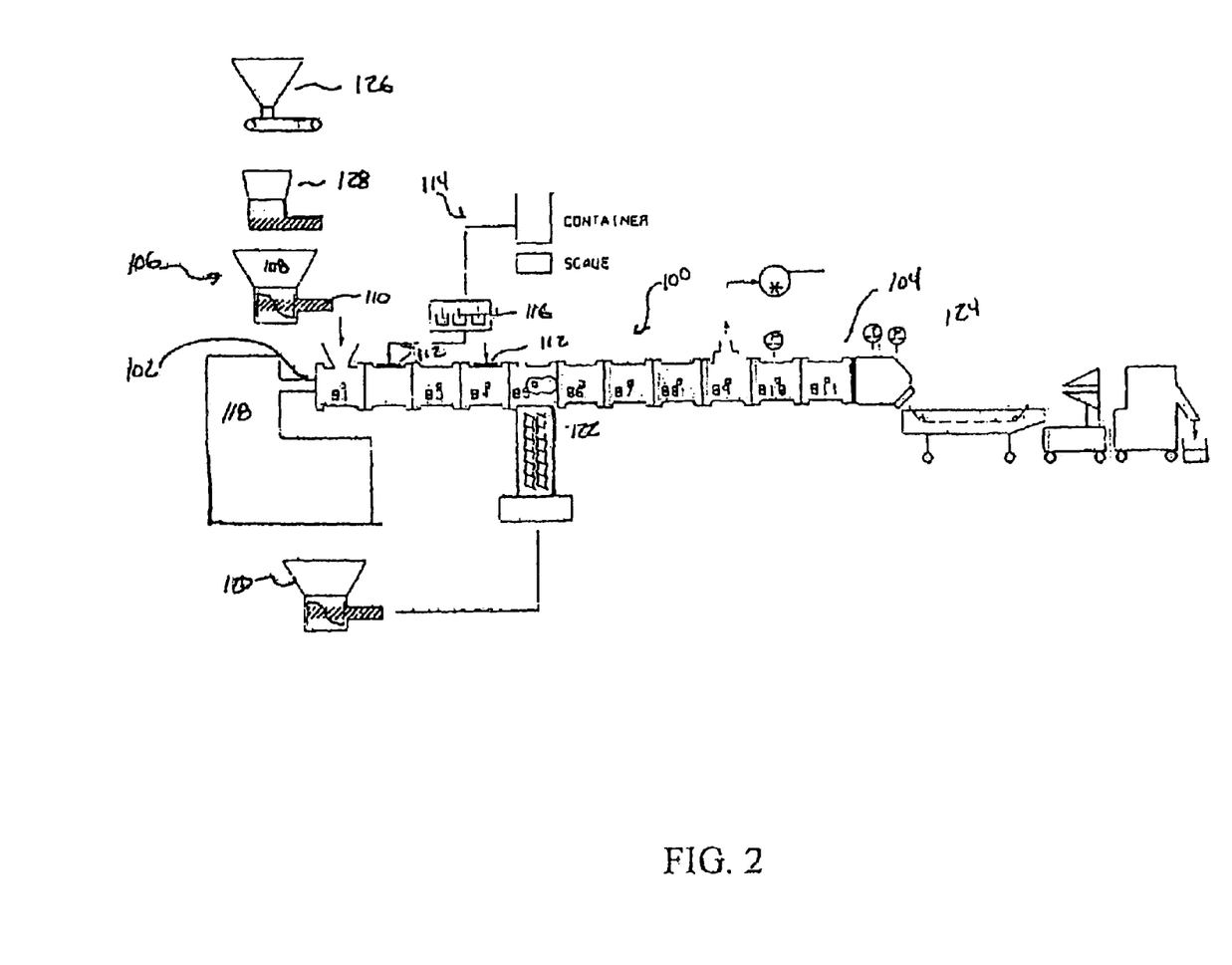
FIG. 2 is a schematic diagram of the formulating apparatus of the present invention.

Referring now to FIG. 2, there is shown a schematic representation of a suitable compounding vessel 100 for use in the process of the present invention. The compounding vessel 100 has a first end 102 and a second end 104. The compounding vessel 100 will include suitable means 106 for introducing non-olefinic thermoplastic material into the interior of the compounding vessel 100. The means 106 are preferably located proximate to the first end of vessel 100 will be connected to suitable mechanisms for feeding non-olefinic thermoplastic material into the interior of the compounding vessel 100. As depicted in FIG. 2, the introduction means 106 can include a suitable hopper 108 and screw feed mechanism 110 calibrated to deliver particulate non-olefinic thermoplastic to the interior of the compounding vessel 100. It is to be understood that the non-olefinic thermoplastic material can be delivered in any form suitable for subsequent processing. Thus while particulate, granular or pelletized material is delivered into the compounding vessel as depicted in FIG. 2, the non-olefinic thermoplastic material may be delivered in a melted state.

The compounding vessel 100 also has suitable auxiliary introduction ports 112 to accommodate the introduction of other components at or near the introduction point of the non-olefinic thermoplastic material. Such ports 112 are adapted to communicate with various feed devices as would be necessary to introduce pigments impact modifiers in the form of liquids and oils and the like into the material to be compounded. Examples of such feed devices include hoppers 126 and 128. As depicted in FIG. 2, the compounding vessel has at least one auxiliary port 112 located downstream of the non-olefinic thermoplastic introduction port 106 to facilitate the introduction of a migratory binder agent such as silicone oil. As depicted in FIG. 2, suitable means 114 for introducing additional component are associated with the introduction port 112. These introduction means 114 include mechanisms and devices necessary to accomplish the introduction of the desired material into the interior of the reaction vessel. As depicted in FIG. 2, the introduction means 114 includes a suitable fluid pump 116 as well as associated metering and measurement devices to accomplish controlled addition of liquid materials such as silicone oils and the like. It is to be understood that a material such as silicone oil may be added at one or multiple ports as desired or required to facilitate proper introduction of the additive to the non-olefinic thermoplastic phase.

The interior of the compounding vessel may be jacketed by a suitably inert atmosphere to prevent or retard oxidation of at least one of the materials being compounded. Thus, the compounding vessel 100 of the present invention may have suitable means for delivering an suitable inert gas into the interior of the reaction vessel 100 (not shown). Where employed the jacketing gas may be any one which will prevent or impede oxidation of the components and/or resulting polymeric composition. Examples of such gasses include nitrogen, or other suitable gasses. Typically, a blanketing gas such as nitrogen is added though at least one compound feed port, but preferably at all feed ports to insure proper blanketing during processing.

Upon introduction, the materials are brought to proper temperature to ensure proper melting of the non-olefinic thermoplastic. The material is subjected to knead mixing for an interval sufficient to insure proper consistency for the addition of thermoplastic polyolefin. Knead melting may be accomplished by any suitable mixing mechanism.

The appropriate knead melt mechanism is positioned in the interior of the compounding vessel and is powered by a suitable power source and mechanism 118. The power source of mechanism 118 is sufficient to provide appropriate kneading, mixing and melt environment to compound the material desired.

The amount of non-olefinic thermoplastic material is introduced into the interior of the compounding vessel 100 is typically in the desired formula weight amount. The compounding device 100 of the present invention may be equipped with appropriate measuring devices, metering devices, scales and computational equipment to ensure that the desired ratio is achieved.

The knead melt mechanism employed in the interior of the compounding vessel 100 is appropriately configured to achieve appropriate mixing and compounding. It is anticipated that the first entry region of the compounding vessel will be one which facilitates the melting and temperature elevation of the introduced non-olefinic thermoplastic material.

The reaction vessel also includes suitable means 120 for introducing polypropylene into the interior of the compounding vessel. The introduction point for the polyolefin, such as polypropylene, is located downstream of the non-olefinic thermoplastic introduction point. Preferably, the polyolefin introduction point 122 is staged at a location in the process stream where the previously introduced non-olefinic thermoplastic is experiencing a ramp down in material temperature. The previously introduced non-olefinic thermoplastic material may be permitted to cool down to a second lower temperature with concomitant increases in agitation turbulence. At this point the polyolefinic material, preferably polypropylene, is added.

The polypropylene material is preferably added as a particulate, granular or pelletized solid. Addition of the polypropylene induces a marked temperature decrease in the processing non-olefinic material with concomitant melting of the polypropylene. In other words, the non-olefinic thermoplastic material cools as it contacts polypropylene. At this lowered temperature, the non-olefinic thermoplastic material entrained in the now melting or melted polypropylene, begins to freeze. The intense agitation which is simultaneously occurring induces the solidifying or freezing the non-olefinic thermoplastic material to form extremely small "islands" in the polypropylene matrix.

Melt kneading continues at this lowered temperature for an interval to insure the proper distribution of the freezing and frozen non-olefinic thermoplastic material in the polypropylene matrix. Intense agitation, turbulence and/or shear keeps the polypropylene from attaining its solidified state. However, the quasi-solid nature of the polypropylene in connection with the frozen non-olefinic thermoplastic material provides for the discrete distinct dispersion of micro cells of non-olefinic thermoplastic material in the discrete quasi-solid polypropylene.

In order to further induce the polypropylene to remain in a quasi-fluidic state, the material can be exposed to minimal vacuum pressure to depress the melt temperature of the two respective materials. During this stage, the compounding material is, preferably, exposed to a sequence of reverse kneading and heat. It is to be understood that the heating can be derived from the frictional nature of the reverse kneading process. However, additional heat may be employed as necessary to maintain the material at the desired processing consistency.

At the second end 104 of the reaction vessel, the material is permitted to exit through an appropriate pelletizing dye. Preferably, the material is cured such as by water or air upon exit to form discrete pellets of the resulting material.

The resulting pelletized polymeric composition demonstrates unique attributes upon exposure to temperature differentials present in injection molding or extrusion operations. The material exhibits essentially homogenous flow characteristics with orientation of high melt thermoplastic relative to the polyolefin such that the resulting workpiece demonstrates a skin rich in non-olefinic thermoplastic surrounding a polyolefin rich core with first or primary migratory compatibilizer present in elevated at quantities interfacial regions between the non-olefinic thermoplastic polymer outer region and the polyolefin inner region.

It has been found, quite unexpectedly, that the surface characteristics of the part which is molded from the resulting pelletized polymeric composition can vary from a molded material having non-olefinic thermoplastic presence adjacent to the outer surface in an essentially continuous phase through to one which exhibits non-olefinic thermoplastic present at the surface as a slightly discontinuous material. Without being bound to any theory, it is believed that the degree of migration of the high melt thermoplastic to the region proximate to the outer surface is influenced by the temperature of the mold and/or tools employed in the molding and/or extrusion process. Relatively higher tool temperature result in migration of non-olefinic thermoplastic as a more continuous phase. Part formation conditions employing cooler tools during the injection and/or molding operations result in the non-olefinic thermoplastic material migrating to the surface as a non-continuous phase. The degree of phase continuity provides aesthetic advantages as it has been found that continuous phase regions of non-olefinic thermoplastic result in a relatively high gloss finish while presence of non-olefinic thermoplastic in a more discontinuous phase yield an aesthetically pleasant satin finish It has been found, quite unexpectedly, that the pelletized polymeric composition of the present invention can be formulated with pigments suitable for molding application. It is also to be understood that the resulting pelletized polymeric composition of the present invention can be augmented by suitably compatible pigments prior to extrusion and/or injection molding operations which are directed toward a finished part. It has been found, quite unexpectedly, that pigmentation is distributed in the resulting molded part in a fashion which is considered to be aesthetically uniform. By this, it is meant that any molding flow lines, knit lines or the like are remarkably absent from the resulting molded part.

Additionally, the resulting pelletized polymeric composition of the present invention can be formulated with metal flake components as are typically known in injection molding and/or extrusion operations. As with pigmentation, it is also to be considered within the purview of this invention that metal flake can be introduced to the pelletized polymeric composition in a subsequent step immediately prior to or during final molding operations. However, the preferred material may contain any pigmentation and/or metal flake characteristics which are desired in the final finished part. The size, composition and other characteristics of the metal flake are typically those suitable for molding and/or extrusion processing. Typically, the size of metal flake present in the composition is determined by impact resistance requirements of the finished part. Such size determinations would be known to the skilled artisan.

It has been found, quite unexpectedly, that metal flake present in the polymeric composition of the present invention does not orient and/or evidence as flow lines in the finished mold part. Instead, the metal flake distributes in a random orientation which is aesthetically similar to the pattern distribution found in metalized painted materials. Thus, the material molded with the polymeric composition of the present invention having metal flake contained therein evidences little or no appreciable presentation of knit lines, such as those proximate to molding gates or orifices. There is also little, if any, evidence of swirl patterns or other characteristics which are typically present at mold depressions.

It has also been found, quite unexpectedly, that molded parts which result from the injection molding and/or extrusion operation using the polymeric composition of the present invention exhibit significant scratch and abrasion resistance and general surface durability well in excess of unmodified olefinic parts. It has also been found, quite unexpectedly, that molded parts which do experience abrasion or scratch events are able to be sanded and polished to restore surface finish. It is believed that abrasion events expose discrete regions of the near interior to a disequilibrium which can be resolved by a discrete localized migratory process. This process can be accelerated and directed by application of heat to the abraded surface. Thus, the molded part composed of the polymeric composition of the present invention possesses attributes which lead to the potential of self-regeneration of the polymeric surface.

To further illustrate the present invention, reference is made to the following examples. These examples are set forth for purposes of illustration and are not considered limitative of the present invention.

EXAMPLE I

Preparation of the polymeric compound is accomplished by the introduction of polyamide 6,6 in an amount sufficient to provide a polyamide portion in the finished compound equal to 49% by weight. The polyamide 6,6 is introduced into a commercially available twin screw knead melt apparatus in pelletized form and is brought to a temperature sufficient to bring and maintain the polyamide in an essentially liquid state. Introduction temperature in the apparatus is 260° C. An amount of silicone oil equal to 0.1% of the total composition weight is added.

An amount of melt-processible pelletized polypropylene in a portion sufficient to provide polypropylene portion equal to 50.9% by weight is added to the agitating polyamide after melting of the polyamide has been achieved. Knead melting continues with the addition of the polypropylene.

A temperature drop occurs with the addition of the polypropylene to a process temperature between about 220 and 245° C. In this temperature range, the polyamide does not freeze and the polypropylene does not experience appreciable thermal decomposition.

Knead melt compounding continues for an interval sufficient to accomplish dispersion of discrete regions of the thermoplastic polyamide in the thermoplastic polyolefin matrix. Typically this is 1 to 100 minutes, depending upon the volume of material being processed.

After knead melt compounding is complete, the material exits the compounding apparatus and is subjected to suitable cooling and pelletizing steps.

The resulting material is a pelletized solid having a polypropylene matrix with discrete regions of polyamide dispersed therein.

EXAMPLE II

A portion of the pelletized material produced in Example I is introduced into a suitable injection mold device with an associated closed cavity mold. The closed cavity mold is configured to produce a rectangular test piece of 2 inches by 4 inches by ½ inch.

The mold is filled with melted material and processed according to standard molding conditions. The resulting plastic part is tested and is against conventional polypropylene test parts. Molded parts made from the material as outlined are found to have greater scratch resistance.

Parts composed of the material prepared in Example I are cut crosswise. The cross section is analyzed. Elevated concentrations of polyamide component are found proximate to the outer surface of the part while elevated concentrations of polypropylene are found proximate to the interior of the part.

EXAMPLE III

An additional amount of polymeric compound is formed according to the process outlined in Example L. The amount of polyamide in this test run is sufficient to produce 1% by weight polyamide in the resulting polymeric compound. The amount of polypropylene is sufficient to provide 98.9% by weight polypropylene in the resulting polymeric compound. Siloxane oil equal to 0.1% is also compounded.

EXAMPLE IV

The pelletized material produced in Example III is introduced into a suitable injection mold device with an associated closed cavity mold device as outlined in Example II.

Parts so prepared are found to exhibit greater scratch resistance over parts prepared from conventional polypropylene. Representative parts are cut in cross section.

Elevated concentrations of polyamide are found proximate to the outer surface of the part.

EXAMPLE V

An additional amount of polymeric compound is formed according to the process outlined in Example I. The amount of polyamide is sufficient to provide 49% by weight polyamide in the resulting polymeric compound. An amount of silicone oil amounting to 1.0% of the total composition weight is added in the manner outlined in Example I. Polypropylene in an amount equal to 50.0% by weight in the finished material is added. The resulting material is pelletized and is a polyolefin matrix with polyamide dispersed therein.

EXAMPLE VI

The pelletized material produced in Example V is introduced into a suitable injection mold device with an associated closed cavity mold device as outlined in Example II.

Parts so prepared are found to exhibit greater scratch resistance over parts prepared from conventional polypropylene. Representative parts are cut in cross section Elevated concentrations of polyamide are found proximate to the outer surface of the part.

EXAMPLE VII

The first material was formulated using polyamide 6,6 and polypropylene according to the process set forth in Example 1. Rectangular test parts ripe, were injection molded according to the process defined in Example II. The test part was analyzed for tensile strength, elongation, fluxural modulus and izod impact strength. The results are set forth in Table I.

EXAMPLE VIII

A polymeric compound of the present invention was formulated using the process of the present invention as outlined in Example I. However, the polyamide 6,6 component was substituted with a polycarbonate/acrylonitrile-butylene-styrene polymeric composite commercially available from various sources. The resulting pelletized material thus produced was introduced into a suitable rectangular mold according to the process set forth in Example II. The physical properties of the resulting rectangular samples were analyzed. The results are set forth in Table 1.

EXAMPLE IX

An additional amount of polymeric compound was formed according to the process of Example I. Polybutylene terephthalate was substituted for the polyamide 6,6 component employed therein. The resulting pelletized material was injection molded according to the process outlined in Example II. Rectangular test samples were analyzed for various physical properties. These results are set forth in Table I.

EXAMPLE X

Polymeric compound was prepared according to the method of Example 1. The polyolefin component was filled with 5% glass reinforcing fibers. The resulting pelletized material was injection molded according to the process outlined in Example II. The rectangular test pieces were evaluated for various physical properties. The results are set forth in Table 1.

TABLE I

Physical Properties of Molded Materials ORIGINAL

| | | EXAMPLE | | | |
|---|---|---|---|---|---|
| | | 1 | 7 | 8 | 9 |
| | | | Raw Material | | |
| Physical Properties | Units | PA | PC/ABS | PBT | PC/PBT glass filled |
| Tensile | psi | 2600 | 2900 | 2800 | 2800 |
| Elongation | % | 88 | 34 | 51 | 30 |
| Flexural Modulus .05"/min | psi | 122,100 | 142,000 | 167,000 | 161,000 |
| Flexural Modulus .5"/min | psi | 144,000 | 160,000 | 185,000 | 182,000 |
| Izod RT | ft-lb/in | NB | 2.0 | 1.0 | 2.0 |

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A melt-processible polymeric material comprising:
   A major portion of an olefinic polymer component selected from the group consisting of polyalkylenes, copolymers of polyalkylenes, and mixtures thereof, the olefinic polymer component farther characterized in that at least one alkylene monomer thereof contains from 2 to 6 carbon atoms;
   A minor portion of a polymer component selected from the group consisting of thermoplastic polyamides, thermoplastic polyesters, thermoplastic polycarbonate, amorphous thermoplastic rubbers, and mixtures thereof;
   Wherein the major portion and the minor portion are present in orientable alloyed relationship; and
   Further comprising at least one primary migratory compatibilizer present in an amount sufficient to promote orientational positioning of the major olefinic polymer portion relative to the minor polymer portion upon application of an orientational inducement force.

2. The melt processible polymeric material of claim 1, wherein the at least one primary migratory compatibilizer is a material capable of promoting bonding at interfacial locations between the minor portion polymer and the olefinic polymer.

3. The melt processible polymeric material of claim 1, wherein the at least one primary migratory compatibilizer is a siloxane oil.

4. The melt-processible polymeric material of claim 1, wherein the minor portion polymer component is selected from the group consisting of thermoplastic polyamides, thermoplastic polyesters derived from ethylene glycol, thermoplastic polycarbonate, amorphous thermoplastic rubbers, and mixtures thereof.

5. A melt-processible polymeric material comprising:
   A major portion of an olefinic polymer component selected from the group consisting of polyalkylenes, copolymers of polyalkylenes, and mixtures thereof, the olefinic polymer component further characterized in that at least one alkylene monomer thereof contains from 2 to 6 carbon atoms, the olefinic polymer having a first melt flow index;

A minor portion of a non olefinic thermoplastic polymer component, the thermoplastic polymer component having a second melt-flow index and selected from the group consisting of thermoplastic polyamides, thermoplastic polyesters, thermoplastic polycarbonates, and mixtures thereof;

Wherein the first melt flow index is lower than the second melt flow index; and

Further comprising at least one compatibilizer present in an amount sufficient to promote orientational positioning of the minor portion thermoplastic polymer relative to the olefinic polymer upon application of an orientational inducement force.

6. The melt processible polymeric material of claim 5, wherein the at least one compatibilizer is a material capable of promoting bonding at interfacial locations between the olefinic polymer and non olefinic minor portion thermoplastic polymer.

7. The melt processible polymeric material of claim 5, further comprising at least a second compatibilizer present in an amount sufficient to promote orientational positioning of the olefinic polymer of the major portion relative to the thermoplastic polymer of the minor portion upon application of an orientational inducement force.

8. The melt processible polymeric material of claim 5, further comprising at least a second compatibilizer, selected from the group consisting of maleic anhydride, copolymers of maleic anhydride and olefinic compounds having monomeric units of at least 2 to 6 carbon atoms, maleic anhydride rubbers, and mixtures thereof.

9. The melt-processible polymeric material of claim 8, wherein the at least second compatibilizer is present in an amount less than that required to effect substantially homogenous integration of the minor portion thermoplastic polymer relative to the olefinic polymer.

10. The melt-processible polymeric material of claim 5, wherein the minor portion polymer component is selected from the group consisting of thermoplastic polyamides, thermoplastic polyesters derived from ethylene glycol, thermoplastic polycarbonate, amorphous thermoplastic rubbers, and mixtures thereof.

11. A molded workpiece having at least one outwardly oriented surface and an interior region, the molded workpiece composed of a thermoplastic material, the thermoplastic material comprising:

an olefinic polymer component selected from the group consisting of polyalkylenes, copolymers of polyalkylenes, and mixtures thereof, the olefinic polymer component further characterized in that at least one alkylene monomer thereof contains from 2 to 6 carbon atoms; and at least one further polymer component selected from the group consisting of thermoplastic polyamides, thermoplastic polycarbonates, thermoplastic polyesters, amorphous thermoplastic rubbers, and mixtures thereof; and at least one compatibilizing agent;

wherein the at least one further polymer component is present at elevated concentrations relative to the olefinic polymer component at a region proximate to the outwardly oriented surface of the workpiece and the olefinic polymer component is present in concentrations relative to the at least one further polymer component in the interior region of the workpiece and wherein the at least one compatibilizing agent is present at interfacial regions between the at least one further polymer component and the olefinic polymer component.

12. The molded workpiece of claim 11, wherein the olefinic polymer component is selected from the group consisting of polypropylene, copolymers of polypropylene, and mixtures thereof.

13. The molded workpiece of claim 12, wherein the thermoplastic polyester is selected from the group consisting of polybutylene terephthalate, polyethylene terephthalate, polytetramethylene terephthalate, and mixtures thereof.

14. The molded workpiece of claim 12, wherein the olefinic component is selected from the group consisting of polypropylene, copolymers of polypropylene, and mixtures thereof.

15. The molded workpiece of claim 12, wherein the compatibilizing agent is siloxane oil present at interfacial regions throughout the workpiece, wherein the at least one further polymer component comprises polyamides, and wherein further the interfacial regions are characterized as having at least some polyamide polymer and at least some olefinic polymer in coordinated contact therewith.

16. The molded workpiece of claim 11, wherein the at least one further polymer component is selected from the group consisting of thermoplastic polyamides, thermoplastic polycarbonates, thermoplastic polyesters derived from ethylene glycol, amorphous thermoplastic rubbers, and mixtures thereof.

17. The molded workpiece of claim 11, wherein the thermoplastic material is oriented such that the at least one further component has a concentration gradient throughout the workpiece and a concentration maximum proximate to the outwardly oriented surface of the workpiece.

18. A method of preparing a polymeric composition suitable for us use in molding processes, the method comprising the steps of:

Agitating an amount of a first thermoplastic, the first thermoplastic having a first elevated processing temperature, the agitation progressing for an interval and at a temperature sufficient to maintain the first thermoplastic in an essentially molten state wherein the first thermoplastic is at least one selected from the group consisting of thermoplastic polyamides, thermoplastic polyesters, and thermoplastic polycarbonates, and mixtures thereof;

Adding an amount of thermoplastic polyolefin to the agitating non olefinic first thermoplastic, the amount of thermoplastic added being greater than the amount of first thermoplastic, wherein the polyolefin added is maintained at a temperature below the first elevated temperature and results in a temperature decrease to a second temperature, the second temperature sufficient to maintain the added polyolefin in a molten state;

Compounding molten first thermoplastic and added thermoplastic polyolefin for an interval sufficient to accomplish random dispersion of discrete regions of first thermoplastic in a thermoplastic polyolefin matrix;

Cooling the molten dispersion to a temperature below which solidification of the resulting thermoplastic compound occurs; and Further comprising the step of adding at least one compatibilizing agent into the first thermoplastic during the initial agitation stage, wherein the at least one compatibilizing agent is essentially non-reactive to the first thermoplastic and polyolefin constituents while resident in the compounding vessel.

19. The method of claim 18, wherein the first thermoplastic is selected from the group consisting of thermoplastic polyamides, thermoplastic polyesters derived from ethylene glycol, and thermoplastic polycarbonates, and mixtures thereof.

* * * * *